(12) United States Patent
Shirbabadi (10) Patent No.: US 8,300,036 B2
(45) Date of Patent: Oct. 30, 2012

(54) METHOD AND APPARATUS FOR REDUCING GLARE AND/OR INCREASING PRIVACY OF A SELF-SERVICE DEVICE

(75) Inventor: Daryoosh Shirbabadi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 249 days.

(21) Appl. No.: 12/825,522

(22) Filed: Jun. 29, 2010

(65) Prior Publication Data

US 2011/0316828 A1     Dec. 29, 2011

(51) Int. Cl.
*G09G 5/00*     (2006.01)
(52) U.S. Cl. .................................. 345/207; 345/158
(58) Field of Classification Search .............. 345/1.1, 345/97, 62, 175, 207; 725/9
See application file for complete search history.

(56) References Cited

U.S. PATENT DOCUMENTS

| | | | |
|---|---|---|---|
| 1,909,302 A | 5/1933 | Moorby | |
| 6,211,930 B1 | 4/2001 | Sautter et al. | |
| 6,282,553 B1 | 8/2001 | Flickner et al. | |
| 6,328,206 B1 | 12/2001 | Schanz et al. | |
| 7,267,312 B2 | 9/2007 | Kang et al. | |
| 7,644,039 B1 | 1/2010 | Magee et al. | |
| 2002/0158967 A1 | 10/2002 | Janick et al. | |
| 2004/0059923 A1 | 3/2004 | ShamRao | |
| 2004/0173671 A1 | 9/2004 | Ferraro | |
| 2005/0201345 A1* | 9/2005 | Williamson | 370/338 |
| 2005/0205735 A1 | 9/2005 | Ichikawa et al. | |
| 2006/0007191 A1* | 1/2006 | Chi et al. | 345/184 |
| 2007/0103552 A1 | 5/2007 | Patel et al. | |
| 2007/0155418 A1 | 7/2007 | Shau et al. | |
| 2007/0253065 A1 | 11/2007 | Doczy et al. | |
| 2008/0030631 A1* | 2/2008 | Gallagher | 348/818 |
| 2009/0002725 A1 | 1/2009 | Huber et al. | |
| 2009/0025022 A1* | 1/2009 | Blatchley et al. | 725/9 |
| 2009/0174658 A1* | 7/2009 | Blatchley et al. | 345/158 |
| 2009/0264194 A1 | 10/2009 | Kompella et al. | |
| 2009/0307853 A1 | 12/2009 | Setzer, Jr. et al. | |

FOREIGN PATENT DOCUMENTS

| | | |
|---|---|---|
| JP | 2008015590 | 1/2008 |
| WO | WO2004114237 | 12/2004 |

OTHER PUBLICATIONS

International Search Report for International Application PCT/US11/24685, Mar. 25, 2011.
International Search Report for Application No. PCT/US 11/24827, Mar. 29, 2011.
International Search Report for Application No. PCT/US 11/24828, Apr. 5, 2011.

* cited by examiner

*Primary Examiner* — Hoa T Nguyen
*Assistant Examiner* — Andrew Sasinowski
(74) *Attorney, Agent, or Firm* — Weiss & Arons LLP; Michael Springs (57) ABSTRACT

A method for minimizing glare and/or increasing privacy for a user of a self-service device is provided. The method may include mechanical means such as a fixed visor and/or hood or a user operated hinged glare reducing overlay screen. The method may further include as using sensors that detect the user's eyes and other sensors to detect a source of light that produces glare. Information from these sensors may be sent to a computer controlled system that operates system of actuators. The actuators are operated by the computer in response to sensor inputs to adjust the screen angle relative the user to minimize glare for that user and/or increase privacy from surreptitiously observing eyes or cameras.

19 Claims, 10 Drawing Sheets

METHOD AND APPARATUS FOR REDUCING GLARE AND/OR INCREASING PRIVACY OF A SELF-SERVICE DEVICE

FIELD OF TECHNOLOGY

Aspects of the disclosure relate to providing apparatus and methods for improving self-service devices such as Automatic Teller Machines ("ATMs"), cash recyclers, and self-service kiosks.

BACKGROUND OF THE INVENTION

Self-service devices such as Automatic Teller Machines ("ATMs"), cash recyclers, and self-service kiosks are often operated by a user outdoors in an exposed environment.

One drawback associated with operation of the ATM outdoors is that direct sunlight or another light source may illuminate the ATM display screen and prevent the user from operating the ATM correctly.

It would be desirable, therefore, to provide apparatus and methods that allow a user to easily operate a self-service device even in the presence of a light source.

Another drawback associated with the aforementioned, substantially ubiquitous, system is that the system is susceptible to fraud. For example, if an unauthorized third-party watches a user enter his or her four-digit PIN, and then manages to misappropriate the user's bank card, the user's entire bank account(s) may be exposed to trespass by the thief. Likewise account numbers, social security numbers or account balances may be exposed. Exposition of this information may lead to identity theft or misappropriation of the user's funds. An unauthorized third party may also position a camera that will view the display screen.

It would be desirable, therefore, to provide apparatus and methods that allow a user to access his or her accounts without exposing the entire scope of his or her financial accounts to trespass.

SUMMARY OF THE INVENTION

An electronic self-service device is provided. The self-service device includes a display screen and may include a keyboard or other input devices. The display screen may be mounted on an electronically controllable mount. The display screen may contain sensors that detect sunlight and may also contain sensors used to detect eyes or cameras. Technology for implementing sunlight-detection sensors, eye-detection sensors and camera-detection sensor is known in the art.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for improving the visibility of a display screen and increasing fraud protection in self-service devices such as Automatic Teller Machines ("ATMs"), cash recyclers, and self-service kiosks are provided. Reduction of glare obscuring the display screen, may include utilization of fixed mechanisms, implementing user-operated measures and/or providing computer-controlled methods according to the invention. Increasing fraud protection according to the invention may include reducing inappropriate access to user account information, exposure to fraud, conversion, theft or any other misappropriation.

A self-service device, which may be an ATM for use with apparatus and methods according to the invention may be made up of one or more of the following devices or other suitable devices: a CPU (which may control user interface mechanisms, transaction devices, and communication with a central server), a magnetic card reader (to identify the card being used), a PIN pad, a cryptoprocessor, a display, function keys (usually in close proximity to the display) and/or a touchscreen, a printer (to provide a transaction record to a customer), a vault (to store portions of the machinery requiring restricted access), and a housing. In certain self-service devices, a smart card reader (that reads a chip instead of a magnetic strip) and bill validation technology may also be implemented. A further feature of a self-service device for use with systems and methods according to the invention may include printing each transaction to a roll paper journal that is stored inside the self-service device.

The apparatus and methods may be scalable, for example, to cover all or a portion of the fleet of ATMs that run on a platform such as that available under the trademark APTRA platform, which is available from the NCR Corporation, Dayton, Ohio.

A self-service device, which may be an ATM, for use with apparatus and methods according to the invention may include a display screen for display to a user. The display screen may be limited to display only, or the display screen may also be a touch screen. It is known that when the user views the display screen, a source of light—e.g., the sun—may cause glare that renders the display screen unusable by the user, or less than optimally usable.

One embodiment of the invention includes a visor and/or hood which shields the display screen from some of the light emanating from directly above the display screen or from the side of the display screen. Such a visor and/or hood can also block, or at least impair, access to an unauthorized third party's view of the display screen.

If the source of light or an unauthorized third party is directly behind the user and is not blocked by the users body the visor and/or hood may not provide adequate shielding for the display screen. To mitigate the deleterious effects of such an eventuality, another embodiment of the invention may include a hinged anti-glare cover that can be moved by the user to cover some or all of the display screen.

In yet another embodiment of the invention, the display screen may be mounted by a system of pivot points and friction devices. Such an arrangement may allow a user to displace the angle of the screen relative to the user's eyes and/or relative to the source of light causing the glare condition. In the alternative, the display screen may be mounted on multiple frictional devices so that the display screen can be tilted in multiple directions. Tilting of the display screen by the user may avoid surreptitiously observing eye(s) or cameras.

Other embodiments utilize the detection of glare by means of one or more sensors coupled to the self-service device. These embodiments preferably respond to certain glare conditions based on pre-determined glare mitigation algorithms as set forth in more detail below in the portions of the specification corresponding to FIGS. 7 and 8. One exemplary response may be automatically moving an anti-glare cover electromechanically over the display screen in response to detection of glare. Detection of non-user eye(s) may also prompt an automated response.

Another embodiment mounts the display screen on one or more actuators. The actuators may be computer controlled stepper motors or solenoids. The actuators may allow the computer to displace the display screen in one or more dimensions so as to minimize glare or improve privacy. The computer controlled embodiments may work with a hinged display screen or a display screen mounted exclusively on computer controlled actuators.

In another embodiment, sensors may detect the position of the user's eyes and adjust the angle of the display screen relative to the location of the user's eyes in a manner that maximizes privacy and, at times, also minimizes glare.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (—e.g., air and/or space).

Figure 1:
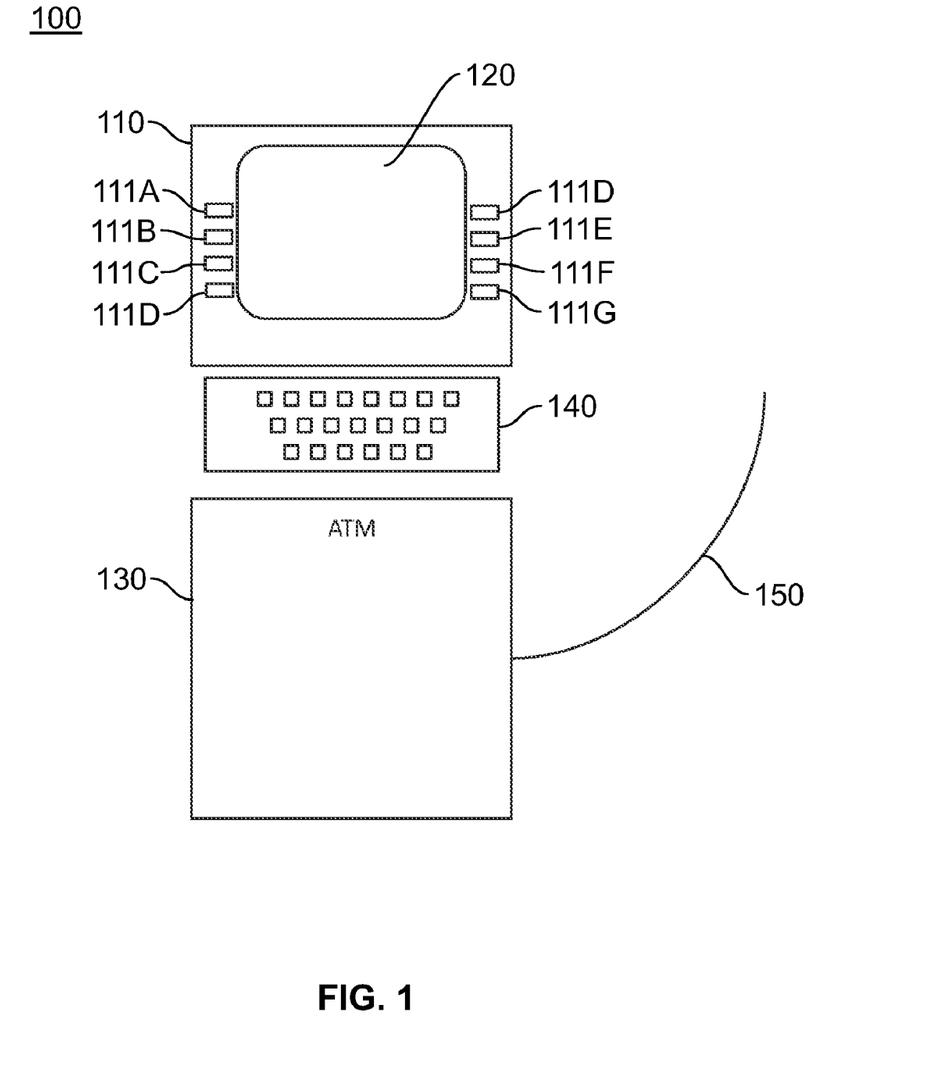
FIG. 1 shows a schematic diagram of a self-service device.

FIG. 1 is a diagram showing an embodiment of a self-service device 100 which may include an upper portion 110, a lower portion 130 and a keyboard 140. The upper portion 110 may include a display screen 120 and a set of buttons 111A-111G. The lower portion 130 may be connected to a network via a cable 150.

Figure 2:
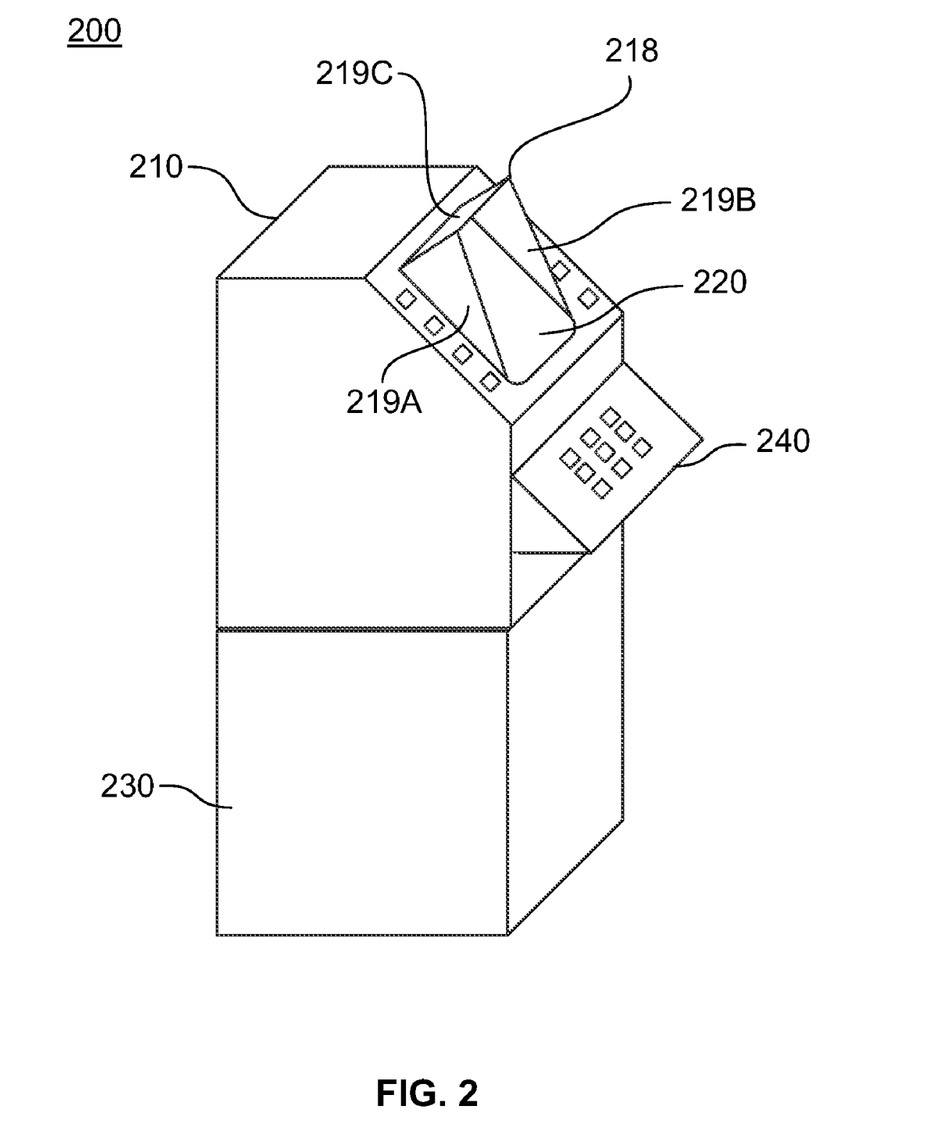
FIG. 2 shows a perspective view of a self-service device with a visor and/or hood according to the invention.

FIG. 2 shows another embodiment of a self-service device 200. FIG. 2 shows a perspective view of a self-service device with a visor and/or hood. Self-service device 200 may include an upper portion 210, a lower portion 230 and a keyboard 240. The upper portion 210 may include a display screen 220 and visor or hood 218.

In one embodiment of the display screen 220 the shape of the display screen is approximately rectangular but other shapes may be used. The display screen 220 may be oriented with respect to the self-service device so that the lower edge of the display screen is approximately parallel to the floor upon which the self-service device rests.

Visor and/or hood 218 may be attached to the self-service device 200. The visor and/or hood 218 may include of an overhead section 219C and two side sections 219A and 219B.

The side sections 219A and 219B of the visor and/or hood 218 are preferably located at the left and right edges of the display screen 220. Side sections 219A and 219B of visor and/or hood 218 are preferably at right angles to the plane of display screen 220. Overhead portion 219C of visor and/or hood 218 is preferably located next to the top edge of the display screen 220.

The angle of overhead section 219C of visor and/or hood 218 may be any suitable angle that prevents glare or improves privacy. Overhead section 219C and side sections 219A and 219B are preferably located on self-service device 200 so that they form an enclosure, blocking glare-producing light from display screen 220. The visor and/or hood 218 may also be designed to reduce viewability by observers that are not directly in front of the display screen 220.

Figure 3:
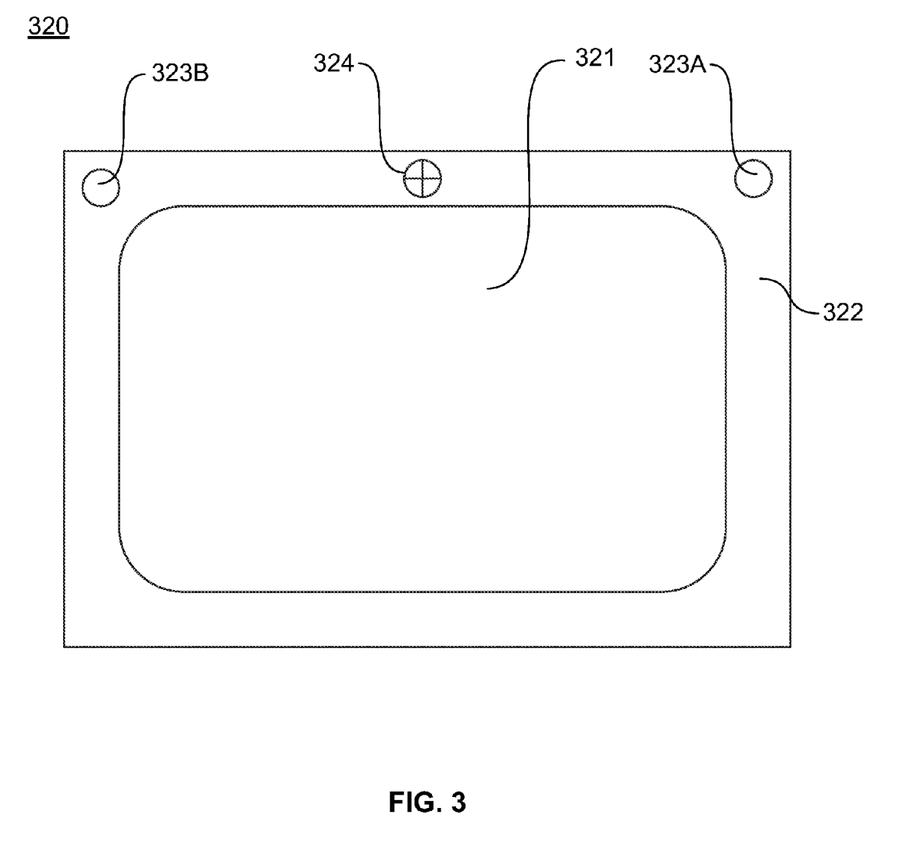
FIG. 3 shows a front view of a self-service device display screen according to the invention.

FIG. 3 shows a front view of an embodiment of a display screen 320. The display screen 320 may include a bezel 322 surrounding the viewable area 321 of the display screen 320. The bezel 322 may include viewing sensors 323A and 323B and a light sensor 324. Viewing sensors 323A and 323B may be used to detect a single eye or pairs of eyes and/or one or more camera lenses. Although two sensors are shown in the FIG. 3 one, two, three or more viewing sensors may be used. Other embodiments may incorporate the sensors into the viewable area 325 of display screen 320 or into other portions of a self-service device.

Figure 4:
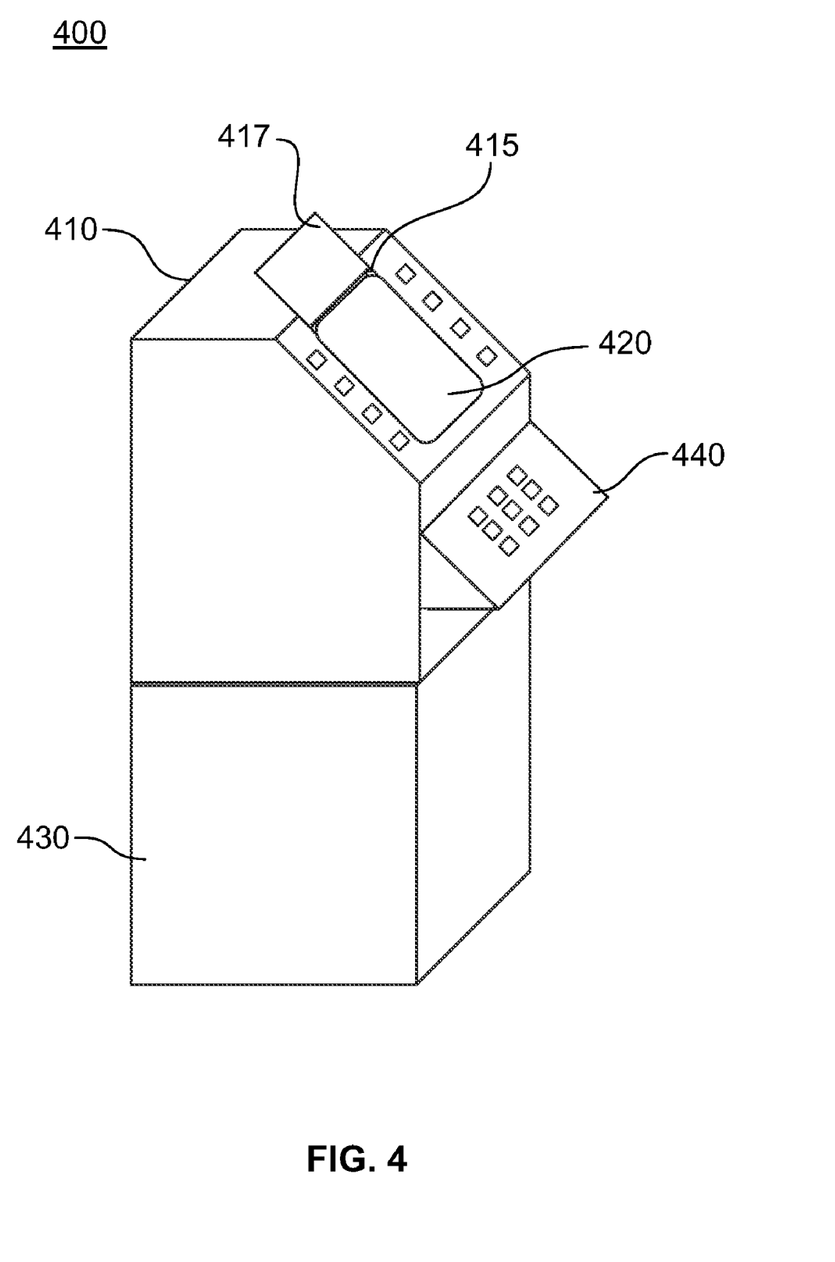
FIG. 4 shows a perspective view of a self-service device with an overlay screen according to the invention.

FIG. 4 shows another embodiment of a self-service device 400. The self-service device 400 may include an upper portion 410, a lower portion 430 and a keyboard 440. The upper portion 410 may include a display screen 420 and an overlay screen 417, such as anti-glare filter display screen which may enhance privacy by limiting viewability from indirectly oriented third-persons, as well as exhibit anti-static, anti-glare and/or anti-radiation properties, affixed to the self-service device 400 via a hinge 415.

Overlay screen 417 preferably includes a lightweight material that blocks glare-causing light. The overlay screen 417 is preferably sized to cover the entirety of the display screen 420 when rotated about the hinge 415 to cover the display screen 420. One implementation of the overlay screen 417 may include a viewing angle reduction screen. Such a screen may preferably reduce the viewing cone that is associated with a particular display screen. Such a screen may make an image seem garbled, poorly saturated, of poor contrast, blurry or too faint outside a desired viewing angle range. For example, some screens reflect more light perpendicular to the screen and less light to the sides, making the screen appear much darker if the viewer is not in front of the screen.

Figure 5:
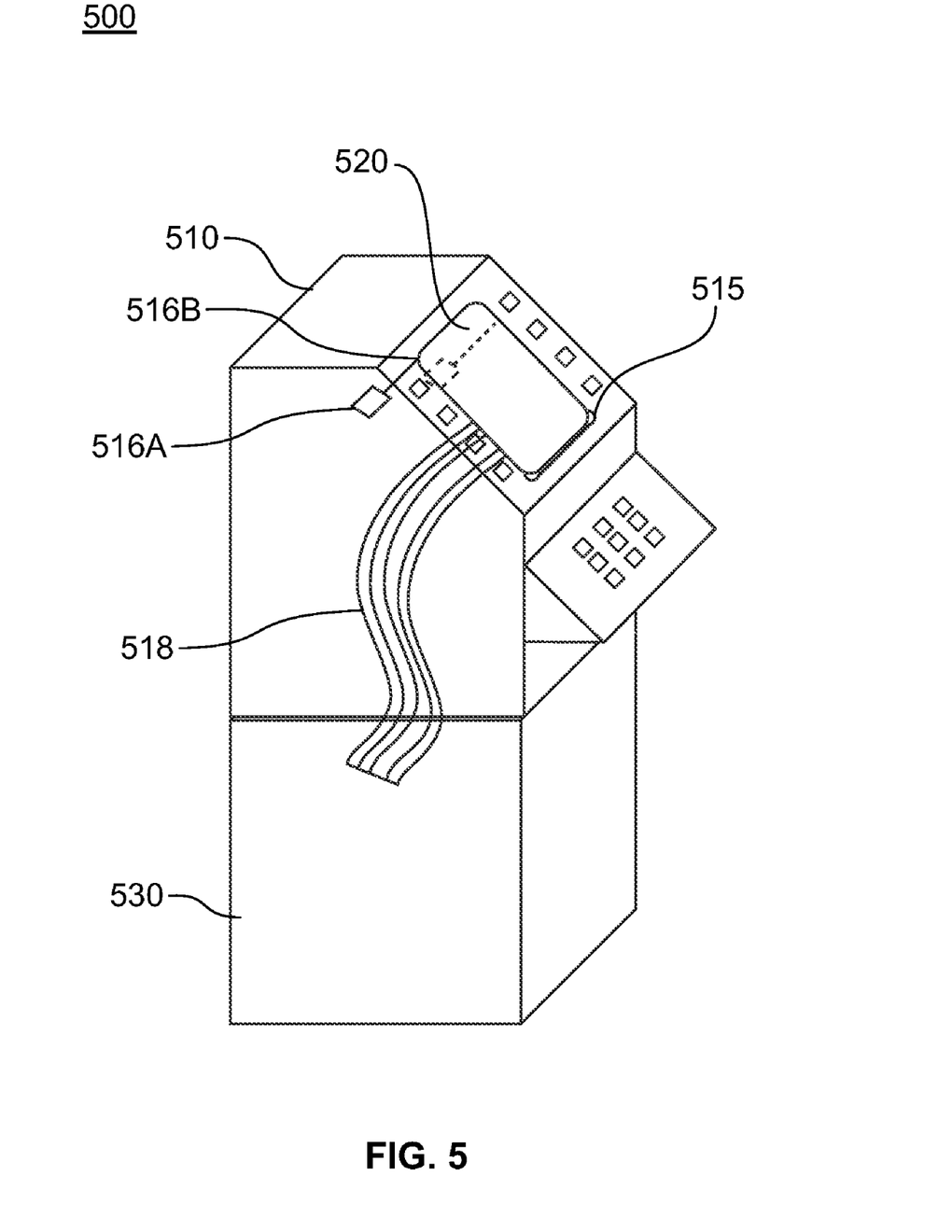
FIG. 5 shows a perspective view of a self-service device where the display screen has a hinge mounting and one-dimensional adjustment according to the invention.

FIG. 5 shows another embodiment of a self-service device 500. Self-service device 500 may include an upper portion 510 and a lower portion 530. The upper portion 510 may include a display screen 520 connected to a cable 518. Cable 518 may bring signals and power to the display screen 520. Cable 518 is preferably of a size and flexibility such that it maintains a connection to display screen 520 even when display screen 520 moves.

Display screen 520 has a lower edge that is relatively closer to the lower portion 530 of the self-service device 500. The display screen 520 has an upper edge that may be relatively further from the lower portion 530 of the self-service device 500. The lower edge of the display screen 520 is connected to the upper portion 510 via a hinge 515. The upper portion of the display screen 530 near the upper edge of display screen 520 may be connected to the upper portion 510 via actuators 516A and 516B.

Actuators 516A and 516B may be solenoids or any similar device that is known in the art which may move display screen 520 relative to upper portion 510 and/or relative to the user of self-service device 500. Display screen 520 may be moved by actuators 516A and 516B by rotating display screen 520 about hinge 515. Algorithms that may implement moveable display screens such as display screen 520 are described in more detail below in the portion of the specification corresponding to FIGS. 7 and 8.

Figure 6:
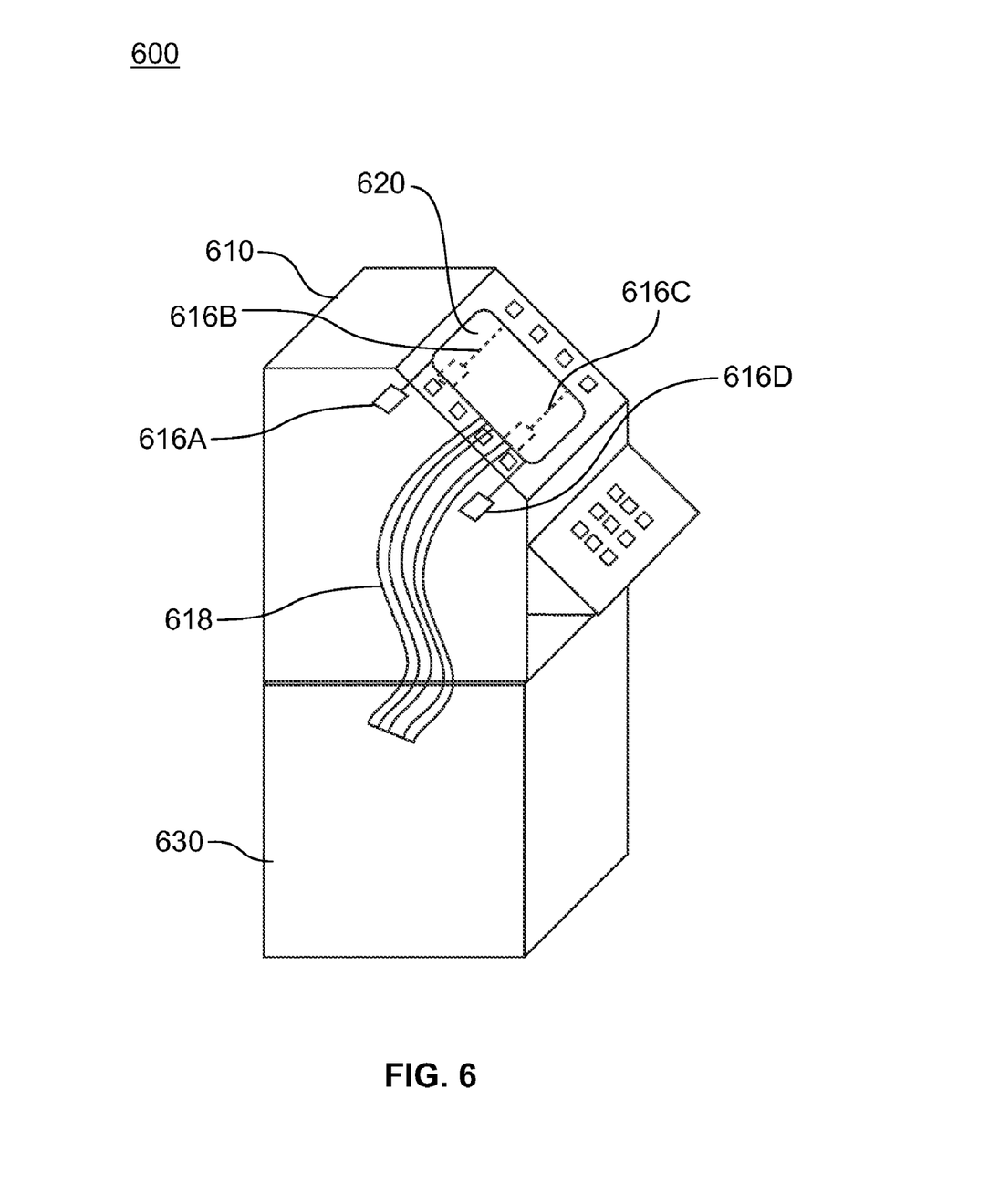
FIG. 6 shows a perspective view of a self-service device where the display screen has two-dimensional adjustment according to the invention.

FIG. 6 shows another embodiment of a self-service device 600. Self-service device 600 may include an upper portion 610 and a lower portion 630. Upper portion 610 may include a display screen 620 connected to a cable 618. Cable 618 may bring signals and power to the display screen 620. Cable 618 is preferably of a size and flexibility such that it maintains a connection to display screen 620 even when display screen 620 moves.

Display screen 620 has four corners. Actuators 616A, 616B, 616C and 616D may each be connected near a corner of display screen 620. Preferably one actuator is connected to each corner of display screen 620.

Actuators 616A-516D may be solenoids or any similar device that is known in the art which may move display screen 620 relative to the upper portion 610 and relative to the user of self-service device 600.

Figure 7:
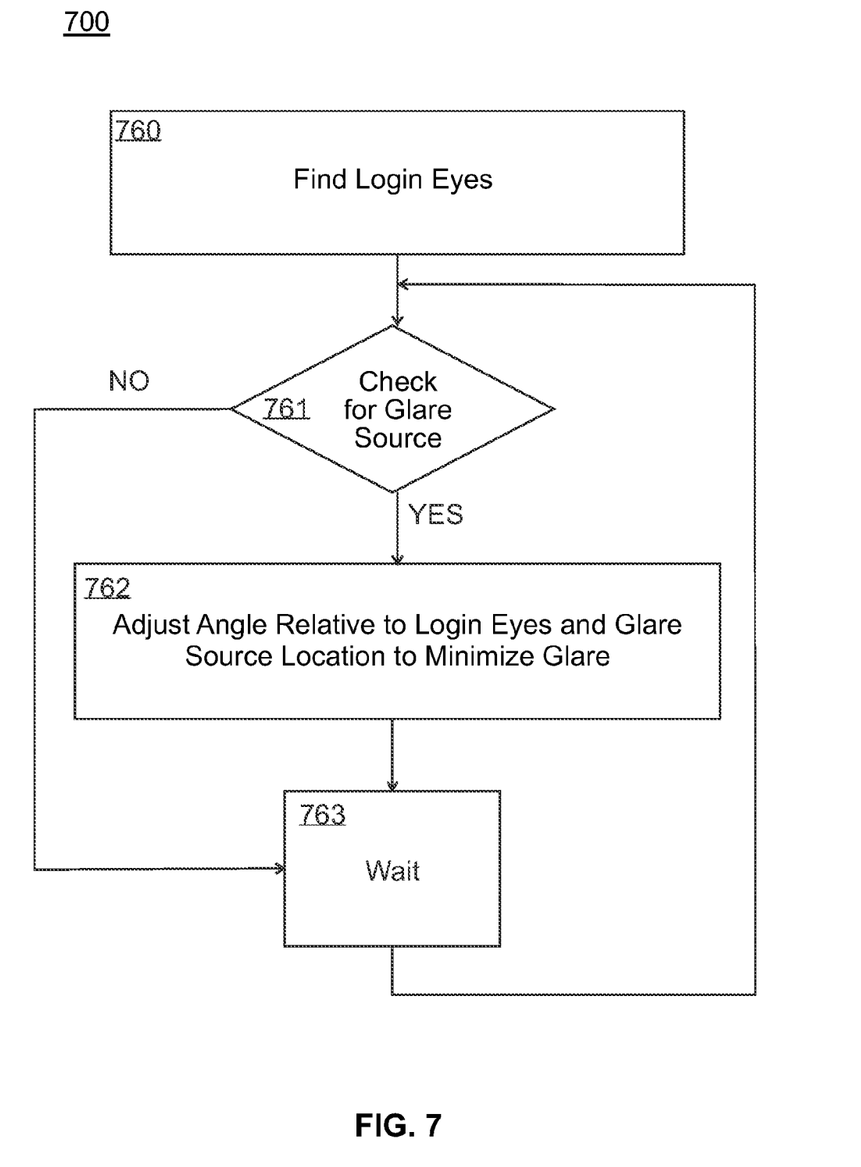
FIG. 7 shows an illustrative flow diagram, according to the invention, that describes a method for minimizing glare relative to a source of light.

FIG. 7 shows a flow chart for implementing an algorithm 700 which may control the movement of a display screen via one or more actuators so as to minimize glare. Algorithm 700 may be employed to control the actuators of the embodiments shown in FIG. 5 or in FIG. 6 or any other computer controllable display screen system.

In step 760 of algorithm 700 a set of eyes that are closest to the self-service device during entry of the PIN are designated as the "login eyes"—i.e., the eyes of the legitimate user of the self-service device. The login eyes may be located using sensors 323A and 323B as shown in FIG. 3.

In step 761 a source of light causing glare—e.g., the sun—may be detected. Alternatively, step 761, as well as any other light detection steps in this application—may detect a predetermined level of light intensity from one or more light sources instead of merely the existence of one or more light sources.

The source of light may be detected by using the sensor 324 as shown in FIG. 3. If no glare condition is detected at step 761 then waiting step 763 may be executed. If a glare condition is detected at step 761, step 762 may tilt the display screen so as to minimize the glare condition relative to the login eyes detected in step 760. Once the glare is minimized the system may wait a period of time, as shown in waiting step 763, and then re-check for the glare condition at step 761. Waiting time of step 763 should preferably be of such a length as to provide suitable real-time adjustment for the self-service device user.

Although the description of algorithm 700 makes use of the sensors of FIG. 3, other arrangements of sensors and display screens are contemplated and are included within the scope of the invention—e.g., a multiple glare sensors—a single eye sensor or more than one display screen on a single self-service device.

Figure 8:
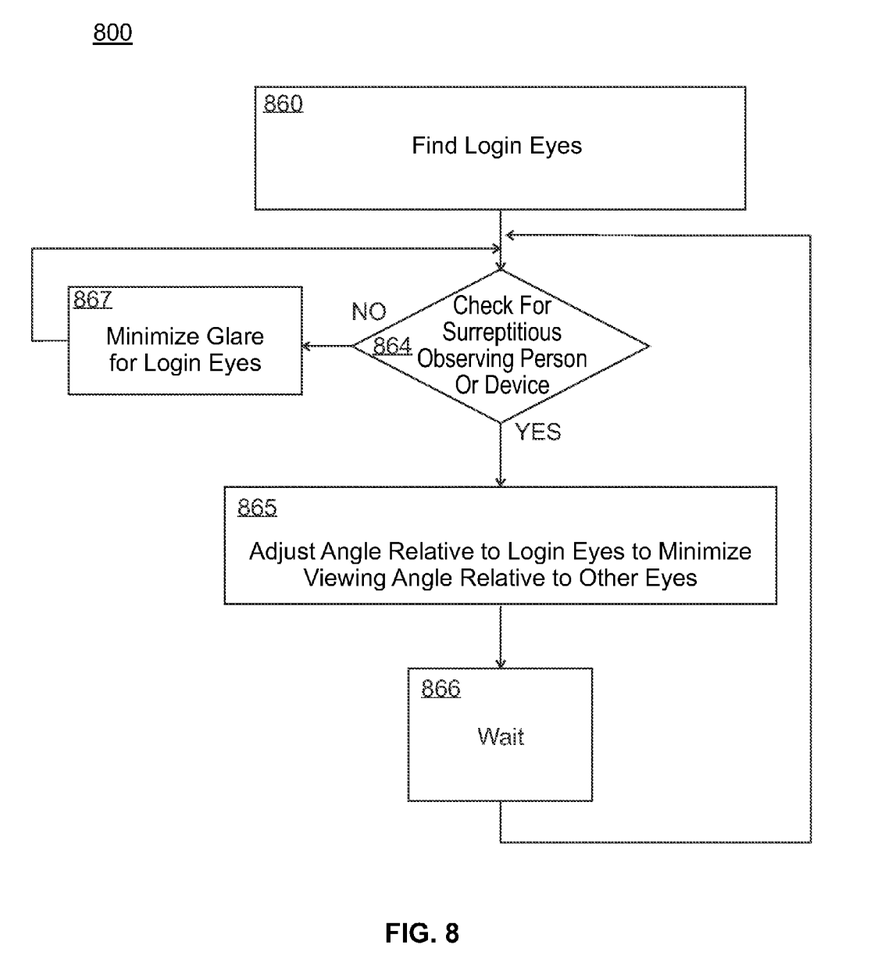
FIG. 8 shows an illustrative flow diagram that describes a method, according to the invention, for improving privacy.

FIG. 8 shows a flow chart for implementing an algorithm 800 for controlling the movement a display screen via actuators. The movement may increase privacy of a user and/or other important effects. The movement of the screen may also minimize glare for the user as an additional criteria but preferably not at the expense of privacy. The algorithm 800 may be employed to control the actuators of the embodiments shown in FIG. 5 or in FIG. 6 or any other computer controllable display screen system.

In step 860 of the algorithm 800, a set of eyes that are closest to the self-service device during entry of the PIN may be designated as the "login eyes." The login eyes may be located using sensors 323A and 323B as shown in FIG. 3. In step 864, the detection system looks for surreptitiously observing person or device—e.g., an eye(s) different from the login eyes and/or a camera lens different from the login eye(s). The surreptitiously observing person or device may be detected using the sensors 323A and 323B as shown in FIG. 3 or by a different set of sensors.

In addition to detecting whether a surreptitiously observing person or device is not detected at step 864, glare can be minimized for the login eyes at step 867. Step 867 may preferably be implemented according to algorithm 700 but any other glare minimizing algorithm may be used.

After a wait step, such as step 763 of algorithm 700, the presence of a surreptitiously observing person or device is re-checked at step 864.

If a surreptitiously observing person or device is detected at step 864 then step 865 may tilt the display screen so as to minimize the viewing of display screen by the surreptitiously observing person or device relative to the login eyes detected in step 760. Once the possible viewing of the surreptitiously observing person or device is minimized, the system may wait a period of time in waiting step 866 and then re-checks for an surreptitiously observing person or device at step 864. The waiting time of the waiting step 866 can be of such a length as to give suitable real-time performance to the user of the self-service device. The waiting time for the glare minimization algorithm, which is preferably step 773 of algorithm 700 may or may not be similar to the waiting time of step 866.

Although the preferred embodiment of algorithm 800 places a primacy for privacy over the reduction of glare other tradeoffs are contemplated and are included within the scope of the invention—e.g., a primacy for reducing glare over privacy, a half-way tradeoff between reducing glare and improving privacy or any other suitable implementation.

Although algorithms 700 and 800 designate the login eyes by choosing the closet pair of eyes during the entry of the personal identification number ("PIN"), other designations are contemplated and are included within the scope of the invention. Login eyes may be designated as the eyes closest to the self-service device to the "swiping" of a bank card (or the like). Other possibilities include requiring the user to register his or her eyes with the self-service device by placing the users face in a visor and/or hood. Such placement also lends itself to biometric identification of the user which is also contemplated within the scope of this invention.

Figure 9:
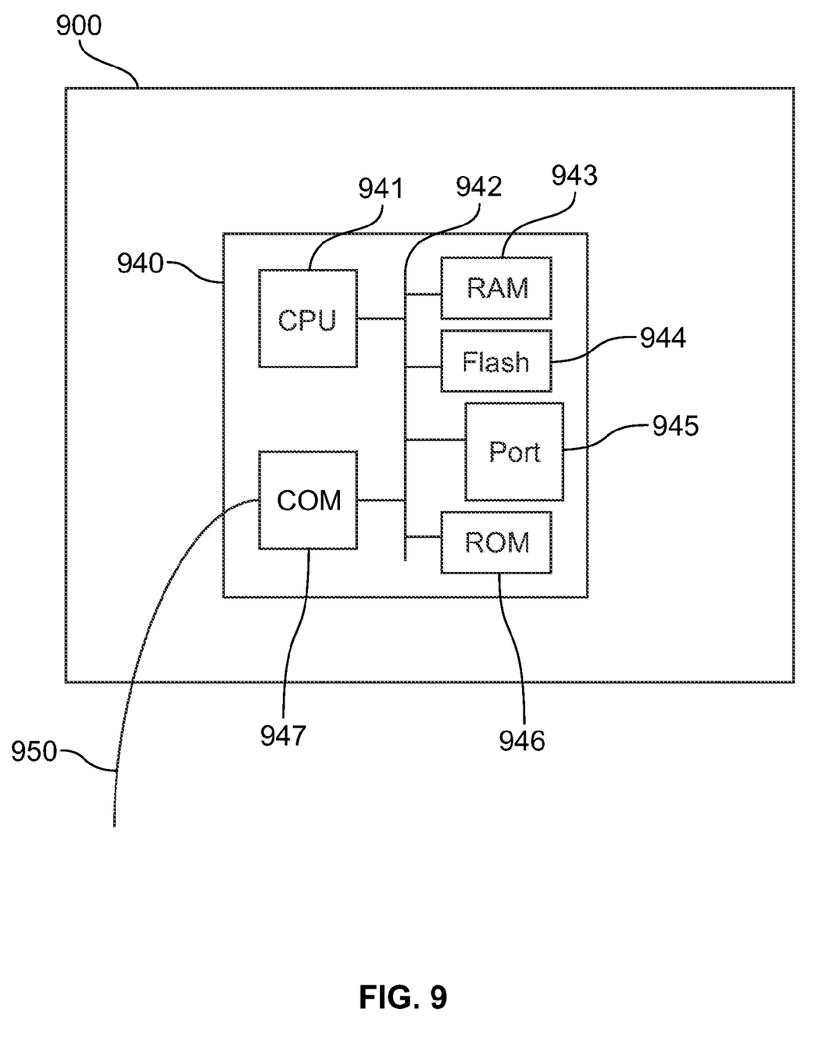
FIG. 9 is a schematic diagram of an exemplary circuit board for use with a self-service device according to the invention.

FIG. 9 shows an exemplary circuit board 900 which may form a portion of a self-service device according to the invention. Circuit board 900 may include ATM system 940. ATM system may include CPU 941, bus 942, RAM 943, flash memory 944, port(s) 945 (for operation of apparatus such as a printer, display, keypad etc.), ROM 946, communications sub-system 947 and communications media 920. Communications sub-system 920 may include a modem. It should be noted, in systems and methods according to the invention, port(s) 945 may be used for additional connectivity to sensors, cameras etc. or other devices that are used in connection with the various aspects of the invention.

Figure 10:
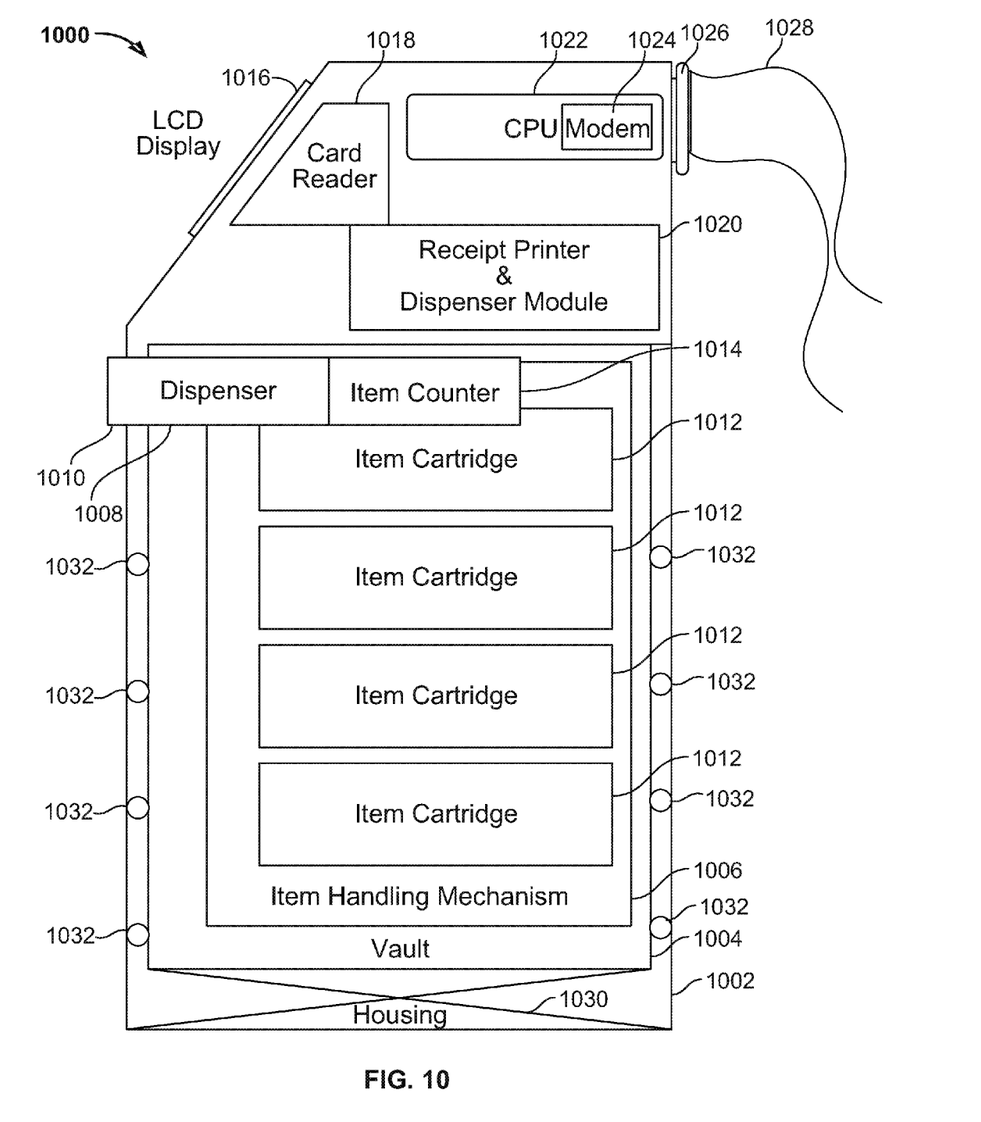
FIG. 10 shows a schematic diagram of another apparatus for use according to the principles of the invention.

FIG. 10 shows yet another embodiment of an ATM according to the invention. In this embodiment of the invention, the ATM 1000 is adjustable along at least one axis of motion, referred to herein as "the axis of adjustability." The axis of adjustability is preferably in a vertical orientation. Such an axis of adjustability preferably allows for movement of the ATM up and down; as needed by an ATM user. Such an ATM preferably includes controls mounted on the ATM console that provide control of the height of the ATM. Such an ATM may preferably be adjustable such that a wheelchair-bound person could adjust the ATM in order to make the ATM suitable for use by the wheelchair-bound person. In other embodiments of the invention, the ATM may be adjustable only along a horizontal axis of adjustment or, alternatively, in combination with being adjustable along a vertical axis.

In certain embodiments of the invention, the buttons may be located on a separate console that is mounted on the wall proximal the ATM machine. Such a wall-mounted console may preferably be easily-accessible even if the ATM was currently located in a relatively high position.

In some embodiments of the invention, following use by a consumer, the ATM may drop to a default level, wherein the relatively low default level is accessible by a wheelchair-bound ATM user.

In certain embodiments of the invention (not shown), the ATM may be movable in two or more tracks that are mounted in a building wall. Such an ATM may be adjustable in a single degree of freedom; up and down with respect to the floor, or multiple degrees of freedom.

In other embodiments of the invention, the ATM may be movable by use of a preferably internally-mounted scissor-jack. The scissor jack may be mounted in the floor of the ATM housing, or in the portion of the floor bounded by the outer walls of the ATM housing.

FIG. 10 shows illustrative self-service device 1000. Self-service device 1000 may include housing 1002. Self-service device 1000 may include vault 1004. Vault 1004 may contain items (not shown). Item handling mechanism 1006 may be present in vault 1004. Item handling mechanism 1006 may store, arrange, dispense and/or otherwise handle items for dispensing.

For example, item handling mechanism 1006 may include conveyors (not shown) for positioning and repositioning items for dispensing by dispenser 1008 through item port 1010. Items (not shown) in item handling mechanism 1006 may be contained in item cartridges 1012. For example, when the items are bills, item cartridges 1012 may be cash cartridges.

Item handling mechanism 1006 may include item counter 1014. Item counter 1014 may count items prior to dispensing by dispenser 1008.

Self-service device 1000 may include LCD display 1016 and a keypad (not shown) for customer interaction. Card reader 1018 may be present for receiving transaction information from the customer via a suitable transaction instrument.

Self-service device 1000 may include receipt printer and dispenser module 1020. Receipt printer and dispenser module 1020 may provide the customer with a record of a transaction. CPU 1022 may control customer I/O, dispensing processes, which may include initialization, actuation, dispensing and any other suitable processes, receipt printing and dispensing, transaction channel communications and any other suitable processes. In certain embodiments of the invention, customer instructions regarding raising or lowering the ATM may be received in CPU 1022.

The transaction channel communications may be performed using modem 1024, which may be any suitable communication device. Modem 1024 may communicate with a local or regional network router via flexible cable 1028. Service monitor 1026 may be provided for a service technician to exchange information and instructions with CPU 1022.

FIG. 10 also includes a schematic representation of scissor-jack 1030 and rollers 1032. In response to a suitable instruction signal from up or down buttons (not shown) mounted either on the ATM console or in a wall preferably proximal the ATM, scissor-jack 1030 may preferably lift or drop vault 1004 relative to housing 1002.

Such a raising or dropping action preferably raises or drops display screen 1016 as well as all the other parts of the ATM, including but not limited to dispenser 1008, with respect to housing 1002 and, thereby, may change the height of the physical access point of the ATM.

In alternative embodiments of the invention, scissor-jack 1030 may be replaced or enhanced by a hydraulic jack (not shown) or other suitable lifting mechanism, such as a suitable actuating mechanism.

In some embodiments of the invention, the function, and structure, of rollers 1032 may be replaced or, alternatively, enhanced by sliding tracks (not shown). Such sliding tracks may be located in a structure of a building. The portion of the ATM that changes height may preferably include projections that ride up and down in the sliding tracks. Such projections may preferably stabilize any vertical movement of the movable portions of the ATM.

In certain embodiments, the vertical movement of the ATM may be administered via the projections into the building. Further, such movement may be implemented by exerting force, from within the building, in a vertical direction on the projections.

Flexible cable 1028 preferably allows ATM to shift either up or down without interruption of electronic communication to the local or regional router or other central computing mechanism.

It should be noted that, because ATM 1000 is being shifted either up or down preferably independently of housing 1002, the communication between modem 1024 and the local or regional network router may preferably continue unaffected by the up or down movement of ATM 100.

It should be further noted that the mechanisms shown in FIG. 10 may be used in place of, or in combination with any of the other mechanisms described in this application to move the ATM display screen, or any other suitable part of the ATM, relative to the ATM user and/or relative to any other suitable point or reference location.

Although the embodiments shown above utilize a display screen that is substantially rectangular, other shapes are contemplated and are included within the scope of the invention—e.g., a circular display screen. Likewise, although the orientation of the display screen relative to the self-service device is shown in an orientation that is substantially rectilinear and storeable within the confines of the upper portion of the self-service device, other orientations are contemplated and included within the scope of the invention. Examples include, without limitation, display screens that have the diagonal of the display screen parallel to the long axis of the self-service device or display screens that fold out from the side of the self-service device.

Although several embodiments are shown wherein the actuators are connected near the corners of the display screen, other configurations are contemplated and are included within the scope of the invention—e.g., redundant actuators.

Thus, apparatus that reduces glare and/or increases privacy of a self-service device have been provided. Persons skilled in the art will appreciate that the present invention can be practiced by other than the described embodiments, which are presented for purposes of illustration rather than of limitation, and that the present invention is limited only by the claims that follow.

What is claimed is:

1. An automated teller machine ("ATM") comprising:
    a display screen comprising an overlay screen disposed over the display screen, the overlay screen that is removable from the display screen;
    one light sensor;
    at least one camera sensor;
    one eye sensor;
    a visor and/or hood; and
    a plurality of actuators;
        wherein the plurality of actuators are operable to change the angle of the display screen relative to a user's eye in response to detection of the user's eye by the eye sensor and further in response to detection of a threshold level of glare by the one light sensor, and the plurality of actuators are further operable to change the angle of the display screen relative to the user's eye in response to detection of the user's eye by the eye sensor and further in response to detection of a second eye by the one eye sensor, and the plurality of actuators are yet further operable to change the angle of the display screen relative to the user's eye in response to detection of a camera by the at least one camera sensor.

2. The ATM of claim 1 wherein the actuator is configured to change the angle of the display screen relative to the user so as to minimize glare from a light source detected by the light sensor.

3. The ATM of claim 1 wherein the light sensor is configured to:
    wait for a period of time; and
    recheck for at least one light source.

4. The ATM of claim 3 wherein, in response to the detection of a light source, the display screen is configured to readjust relative to a user's eye.

5. The ATM of claim 1 wherein the eye sensor is configured to:
    wait for a period of time; and
    recheck for at least one eye that is not the user's.

6. The ATM of claim 5 wherein, in response to the detection of a non-user's eye, the display screen is configured to readjust relative to a user's eye.

7. The ATM of claim 1 wherein the eye sensor is configured to:
    wait for a period of time; and
    recheck for at least one eye belonging to the user.

8. The ATM of claim 1 wherein the camera sensor is configured to:
    wait for a period of time; and
    recheck for at least one camera.

9. The ATM of claim 8 wherein, in response to the detection of a camera, the display screen is configured to readjust relative to a user's eye.

10. The ATM of claim 1 wherein the overlay screen is a viewing angle reduction screen.

11. The ATM of claim 1 wherein the second eye is an eye not belonging to the user.

12. The ATM of claim 1 wherein the angle of display is configured to change to minimize viewing of the display screen by a non-user.

13. The ATM of claim 1 wherein the angle of display is configured to change to prevent a non-user from viewing the display screen.

14. A method for reducing glare on a display screen of an automated teller machine ("ATM"), the method comprising:
    affixing to the ATM a removable overlay screen disposed over the display screen;
    using a light sensor located on the ATM to detect at least one light source;
    using a camera sensor located on the ATM to detect at least one camera;
    using an eye sensor located on the ATM to detect at least one eye;
    affixing a visor and/or hood to the ATM to reduce glare;
    using at least one actuator to adjust an angle of the display screen relative to the eye detected by the eye sensor, said adjustment for reducing glare from a light source detected by the light sensor; and
    using at least one actuator to adjust an angle of the display screen relative to the eye detected by the eye sensor, said adjustment for reducing viewing by the camera detected by the camera sensor.

15. The method of claim 14 further comprising:
    waiting for a period of time; and
    rechecking, with the light sensor, for a light source.

16. The method claim 14 further comprising:
    detecting a light source; and
    in response to the detection of the light source, readjusting the display screen relative to a user's eye.

17. The method of claim 14 further comprising:
    waiting for a period of time; and
    rechecking, with the eye sensor, for at least one eye that is not the user's.

18. The method of claim 14 further comprising:
    waiting for a period of time; and
    rechecking, with the eye sensor, for at least one eye belonging to the user.

19. The method of claim 14 further comprising:
    waiting for a period of time; and
    rechecking, with the camera sensor, for at least one camera.

* * * * *